United States Patent
Amurri et al.

(10) Patent No.: US 9,550,337 B2
(45) Date of Patent: Jan. 24, 2017

(54) METHOD OF CONTROLLING DEPOSITION OF A CONTINUOUS ELONGATED ELEMENT IN BUILDING A TYRE FOR VEHICLE WHEELS, PROCESS AND APPARATUS FOR BUILDING A TYRE FOR VEHICLE WHEELS

(75) Inventors: Cesare Emanuele Amurri, Milan (IT); Maurizio Marchini, Milan (IT); Gaetano Lo Presti, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 800 days.

(21) Appl. No.: 13/643,249

(22) PCT Filed: Apr. 12, 2011

(86) PCT No.: PCT/IB2011/051567
§ 371 (c)(1),
(2), (4) Date: Oct. 24, 2012

(87) PCT Pub. No.: WO2011/135473
PCT Pub. Date: Mar. 11, 2011

(65) Prior Publication Data
US 2013/0037203 A1    Feb. 14, 2013

Related U.S. Application Data

(60) Provisional application No. 61/331,081, filed on May 4, 2010.

(30) Foreign Application Priority Data

Apr. 26, 2010  (IT) .............................. MI2010A0710

(51) Int. Cl.
*B29D 30/30*  (2006.01)
*B29D 30/60*  (2006.01)
*B29D 30/16*  (2006.01)

(52) U.S. Cl.
CPC ................ *B29D 30/16* (2013.01); *B29D 30/30* (2013.01); *B29D 30/60* (2013.01); *B29D 30/1628* (2013.01); *B29D 30/3028* (2013.01)

(58) Field of Classification Search
CPC ............ B29D 30/1621; B29D 30/1628; B29D 30/3021; B29D 30/3028; B29D 30/60
(Continued)

(56) References Cited

U.S. PATENT DOCUMENTS

RE25,349  E   *  3/1963  Hanson .......................... 156/130
3,418,191  A  * 12/1968  Dieckmann ............ B29D 30/60
                                                         156/130
(Continued)

FOREIGN PATENT DOCUMENTS

EP    0 968 814 A2    1/2000
EP    1 279 486 A2    1/2003
(Continued)

OTHER PUBLICATIONS

Translation of paragraph [0004] of JP 2004-216726A; patent document published Aug. 5, 2004.*
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A method of controlling deposition of a continuous elongated element in building a tire for vehicle wheels, includes: feeding an initial end of a continuous elongated element of elastomeric material through a slit bounded by a first roller and a second roller of a calender; retaining the continuous elongated element against a peripheral surface of the first roller; laying the initial end of the continuous elongated element against a deposition surface; rotating the calender around an oscillation axis that is substantially coincident (Continued)

with a contact generatrix between the first roller and the second roller; and dragging along the continuous elongated element together with the deposition surface.

13 Claims, 6 Drawing Sheets

(58) Field of Classification Search
USPC .................. 156/117, 130, 397, 123, 437
See application file for complete search history.

(56) References Cited

U.S. PATENT DOCUMENTS

| | | | |
|---|---|---|---|
| 6,372,070 | B1 | 4/2002 | Iizuka et al. |
| 2003/0025238 | A1* | 2/2003 | Ogawa ..................... 264/211.12 |
| 2008/0041514 | A1 | 2/2008 | Uchida et al. |
| 2008/0105361 | A1* | 5/2008 | Senbokuya et al. .......... 156/136 |
| 2009/0025857 | A1 | 1/2009 | Marangoni et al. |
| 2009/0283203 | A1 | 11/2009 | Marchini et al. |
| 2011/0036485 | A1* | 2/2011 | Rey et al. ..................... 156/117 |
| 2011/0192526 | A1* | 8/2011 | Ogawa .......................... 156/117 |

FOREIGN PATENT DOCUMENTS

| | | | |
|---|---|---|---|
| EP | 1 815 971 A1 | | 8/2007 |
| EP | 2 106 901 A1 | | 10/2009 |
| JP | 2004-017621 A | * | 1/2004 |
| JP | 2004-216726 | | 8/2004 |
| WO | WO 2007/000443 A1 | | 1/2007 |
| WO | WO 2008/018098 A1 | | 2/2008 |
| WO | WO 2008/053278 A1 | | 5/2008 |
| WO | WO 2009/040594 A1 | | 4/2009 |

OTHER PUBLICATIONS

English-language Communication pursuant to Article 94(3) EPC dated Apr. 4, 2014 from the European Patent Office in corresponding European Patent Application No. 11 772 891.6-1706.

International Search Report from the European Patent Office for International Application No. PCT/IB2011/051567, mailing date Aug. 5, 2011.

Written Opinion of the International Searching Authority from the European Patent Office for International Application PCT/IB2011/051567, mailing date Aug. 5, 2011.

* cited by examiner

METHOD OF CONTROLLING DEPOSITION OF A CONTINUOUS ELONGATED ELEMENT IN BUILDING A TYRE FOR VEHICLE WHEELS, PROCESS AND APPARATUS FOR BUILDING A TYRE FOR VEHICLE WHEELS

CROSS REFERENCE TO RELATED APPLICATIONS

This application is a national phase application based on PCT/IB2011/051567, filed Apr. 12, 2011, which claims the priority of Italian Patent Application No. MI2010A000710, filed Apr. 26, 2010, and the benefit of U.S. Provisional Application No. 61/331,081, filed May 4, 2010, the content of all of which is incorporated herein by reference.

BACKGROUND OF THE INVENTION

Field of the Invention

The present invention relates to a method of controlling deposition of a continuous elongated element in building a tyre for vehicle wheels, to a process and apparatus for building a tyre for vehicle wheels.

Description of the Related Art

A tyre generally comprises a carcass structure including at least one carcass ply having end flaps in engagement with respective annular anchoring structures, each of them being usually made up of at least one substantially circumferential annular insert to which at least one filling insert is applied. A belt structure is associated with the carcass structure, at a radially external position thereof and it comprises one or more belt layers disposed in radially superposed relationship to each other and to the carcass ply and comprising textile or metallic reinforcing cords having a crossed orientation and/or being substantially parallel to the circumferential extension direction of the tyre. Applied at a radially external position to the belt structure is a tread band also of elastomeric material like other semifinished products constituting the tyre. A so-called "under-layer" of elastomeric material can be interposed between the tread band and the belt structure, which under-layer has properties suitable to ensure a steady union of the tread band itself. Respective sidewalls of elastomeric material are further applied onto the side surfaces of the carcass structure, each extending from one of the side edges of the tread band until close to the respective annular anchoring structure to the beads.

It should be pointed out, to the aims of the present specification that the term "elastomeric material" is understood as indicating a composition comprising at least one elastomeric polymer and at least one reinforcing filler. Preferably, this composition further comprises additives such as a cross-linking agent and/or a plasticizer, for example. Due to the presence of the cross-linking agent, this material can be cross-linked through heating, so as to form the final article of manufacture.

It is presently known to make components of elastomeric material of the tyre directly on one or more supports. Note that by "component of elastomeric material" of the tyre in this context it is intended any part of elastomeric material of the tyre (tread band, sidewalls, liner, under-liner, fillers in the bead region, sidewall inserts in run flat tyres, abrasion-proof inserts, for example) or a portion thereof, or yet the assembly formed with two or more of said parts or portions.

Document EP 1 279 486 discloses a method of making a shaped rubber body, such as a green tyre or a component of this tyre, on a rotary support. This rubber body is made through extrusion of a rubber strip by a movable extrusion system, which comprises a screw extrusion unit, a gear pump and an extrusion head provided with an extruder nozzle, connected in series. The rubber strip is fed to a rotary support along a substantially rectilinear passage extending from the screw extrusion unit to the extruder nozzle. The rubber strip is fed to a rotary support along a substantially rectilinear passageway extending from the screw extrusion unit to the extruder nozzle. The rubber strip is further passed through a slit defined between two presser rollers and applied onto an outer surface of the rotary support by one of said two presser rollers.

Document EP 0 968 814 illustrates how to deposit elastomeric material onto a support driven in rotation using a positive-displacement extruder for feeding the elastomeric material, by disposing a pair of rollers rotating in opposite directions in the vicinity of a radially external surface of a supporting portion and using the slit bounded between the rollers as the calender for the elastomeric material coming from the extruder.

Document WO 2008/053278, in the name of the same Applicant, describes an apparatus for building tyres comprising a forming support and an assembling device for assembling components of elastomeric material on the forming support. The assembling device comprises a feeding unit for supplying a continuous elongated element of elastomeric material, a conveyor having a surface movable along a predetermined direction and towards a proximal end thereof adjacent to the forming support; an application device positioned at the proximal end. The continuous elongated element is advanced on the movable surface until the proximal end, and the forming support is rotated to enable application of the continuous elongated element in the form of coils wound up on the forming support. A holding roller is mounted above the movable surface of the conveyor and cooperates with the conveyor for cutting the continuous elongated element at the end of an application step of the latter onto the forming support. The holding roller retains the just cut end of the continuous elongated element supported by the conveyor. The continuous elongated element is therefore ready for a new application on the forming support.

Document WO 2009/040594 in the name of the same Applicant discloses a process for building tyres for vehicle wheels comprising: building a carcass structure on a first forming drum in a carcass-structure building line; building a crown structure on a second forming drum in a crown-structure building line; shaping the carcass structure into a toroid, assembling it to the crown structure in an assembling and shaping station; vulcanising and moulding the green tyre in a vulcanisation and moulding line separated from the carcass and crown building lines.

SUMMARY OF THE INVENTION

The Applicant has found that in devices of known type, as those described in the aforesaid documents EP 1 279 486 and EP 0 968 814, starting of deposition, when the head of the continuous elongated element coming out of the extruder is brought to a position between the two calender rollers (referred to as "routing") and subsequently against the forming support, is critical because the element has a tendency to separate from the rollers or to adhere to one of them rather than the other without any control and it is not therefore correctly guided against the forming support. This involves an average extension of the cycle times because working must be stopped so as to remedy the drawback.

The Applicant has further found that leaving the continuous elongated element routed between the two rollers in the period between two depositions is dangerous because this does not enable the extruder to be purged and the portion of the elongated element remaining between the rollers becomes wider and cools, due to stopping between a cycle and the following one, so that it has necessarily to be eliminated before starting a new deposition in order to avoid formation of faults on the tyre.

The Applicant has further noticed that if a solution like that disclosed in document WO 2008/053278 is adopted, the same problem exists, because the continuous elongated element after being cut remains routed between the conveyor and the holding roller.

Within the scope of the highly automated modern plants for tyre production, like that of the type illustrated in WO 2009/040594, the Applicant has felt the necessity to reduce the cycle times of the individual production steps as well as the time the machine is at a standstill for servicing and/or possible inconveniences arisen during building of the tyre, so as to increase productivity.

In particular, the Applicant has perceived that the steps and related devices for deposition of continuous elongated elements of elastomeric material on the forming support provided for manufacture of carcass or crown components such as the carcass liner or belt under-layer for example, can be made more reliable and quicker.

More specifically, the Applicant has understood that by eliminating the problems correlated with movement of the continuous elongated element at the beginning of a new application step of same onto a deposition surface, building of the component of elastomeric material obtained from said application is achieved in a more reliable manner and in accordance with the design conditions.

The Applicant has finally found that if the continuous elongated element is retained on one of the two rollers of a calender during and immediately after routing and the head of the same continuous elongated element is applied against the deposition surface, bringing the roller itself against the same deposition surface, said application can be started without running the risk of creating faults in the tyre component that is going to be built.

More specifically, in a first aspect, the present invention relates to a method of controlling deposition of a continuous elongated element in building a tyre for vehicle wheels, comprising:

feeding an initial end of a continuous elongated element of elastomeric material through a slit bounded by a first roller and a second roller of a calender;
retaining said continuous elongated element against a peripheral surface of the first roller;
laying said initial end of the continuous elongated element against a deposition surface;
dragging along the continuous elongated element together with the deposition surface.

It is the Applicant's opinion that in this manner the continuous elongated element is fed without distortion and flaws onto the forming drum making the building process reliable and obtaining a product in compliance with the design conditions.

More specifically, in accordance with a second aspect, the present invention relates to a process for building a tyre for vehicle wheels comprising assembling of components of elastomeric material on a forming drum, in which at least one of the components of elastomeric material is obtained by:

producing a continuous elongated element of elastomeric material through an extruder;
feeding an initial end of said continuous elongated element of elastomeric material on a peripheral surface of a first roller of a calender through a slit bounded by said first roller and by a second roller of said calender;
rotating the calender around an oscillation axis for moving the first roller from a position spaced apart from the forming drum to a position close to said forming drum until laying said initial end of the continuous elongated element against a deposition surface radially external to said forming drum;
driving the continuous elongated element in rotation together with the forming drum so as to determine application of said continuous elongated element on said forming drum.

In a third aspect, the present invention relates to an apparatus for building a tyre for vehicle wheels, comprising:

a forming drum rotating about an axis thereof;
an extruder;
a calender mounted on a frame and comprising a first roller and a second roller disposed close to each other at radially peripheral portions thereof and defining a slit; wherein the frame is movable relative to a supporting base of the frame itself around an oscillation axis;
an actuating device acting on the frame for moving the calender around the oscillation axis between a first position, at which the first roller is spaced apart from the forming drum, and a second position, at which the first roller is disposed close to said forming drum.

The Applicant thinks that the above structure will also allow servicing and purging interventions on the extruder to be carried out easily because at the end of each deposition the elongated element must not necessarily remain between the rollers. The rollers can be moved apart, sideways for example, by means of another actuating device, from the outlet opening of the extruder to enable automatic purging.

The present invention, in at least one of said aspects, can also have one or more of the preferred features described hereinafter.

In a preferred form of the method said continuous elongated element is retained against the peripheral surface of the first roller by driving said first roller in rotation at a peripheral speed lower than a peripheral speed of the second roller.

Preferably, the ratio of the peripheral speed of the second roller to the peripheral speed of the first roller is included between about 1.05 and about 1.25.

Preferably, the peripheral speed of the first roller is included between about 40 m/s and about 240 m/s.

Preferably, the peripheral speed of the second roller is included between about 50 m/s and 250 m/s.

The lower speed makes the continuous elongated element bend towards the slower roller, separating it from the faster roller and causes said elongated element to remain stuck to the latter. The speed ratio is set based on the compound to be used.

According to a preferred embodiment of the method, the initial end of the continuous elongated element is laid against the deposition surface when it has carried out, together with the peripheral surface of the first roller, a rotation relative to said slit included between about 70° and about 110°.

This rotation brings the head of the continuous elongated element onto an end portion of the calender that is brought into contact with the deposition surface without the risk that other parts of the calender itself may touch said deposition surface in motion.

According to a preferred embodiment of the method, said initial end of the continuous elongated element is laid against said deposition surface by rotating the calender around an oscillation axis.

Preferably, the oscillation axis is substantially coincident with a contact generatrix between the first roller and the second roller.

The distance between the slit and the outlet opening of the extruder remains substantially fixed during rotation of the calender moving close to the deposition surface and during possible oscillations caused by undulations or unevenness of the surface itself. By maintaining said distance fixed, generation of traction/compression phenomena on the continuous elongated element coming out of the slit (or, in other words, the pulsating variation of the instantaneous delivery of said continuous elongated element) is avoided, so that the consequent formation on the continuous elongated element of swollen portions (with greater section) alternated with portions with smaller section (pulsating elongated element) can be avoided.

In a preferred embodiment, the process comprises: going on pressing the continuous elongated element against the forming drum by means of the first roller during rotation of said continuous elongated element together with said forming drum.

Preferably, the first roller rotates in an idle manner being dragged along by the forming drum.

The first roller rotates in an idle manner being driven by friction by the forming drum to which it remains coupled during the whole deposition with interposition of the continuous elongated element.

In an alternative embodiment, the process comprises: moving the first roller away from the forming drum after laying said initial end of the continuous elongated element against the deposition surface.

Preferably, the first roller moved away from the forming drum is mechanically coupled to the second roller for rotation, being dragged along by said second roller.

In addition, preferably, the continuous elongated element is pressed against the forming drum by an auxiliary wheel during rotation of said forming drum.

After deposition of the head of the continuous elongated element, the first roller is separated from the drum and held in rotation through mechanical friction coupling with the second roller. During rotation of the drum, the continuous elongated element goes on being pressed against the drum by the auxiliary wheel and the peripheral speed of the first roller and the second roller are the same speeds they had during the starting dragging along of the continuous elongated element before pointing to the forming drum.

Preferably, the initial end of said continuous elongated element is fed onto the peripheral surface of the first roller by setting the first roller in rotation at a peripheral speed lower than a peripheral speed of the second roller.

Preferably, on moving from the position spaced apart from the forming drum to the position close to said forming drum the first roller carries out a displacement included between about 10 mm and about 30 mm.

This movement is preferably carried out while the head of the continuous elongated element covers an arc of a circumference together with the first roller starting from the slit until reaching the most advanced position of the aforesaid first roller.

Preferably, the continuous elongated element is applied onto the forming drum in the form of coils disposed in side by side relationship and/or at least partly overlapped.

In a preferred embodiment, the calender comprises a motor operatively coupled to the second roller.

In a preferred embodiment, the apparatus comprises a friction mechanism operatively interposed between the first roller and the second roller.

Preferably, said friction mechanism is movable between at least one engagement position, at which it drives the first roller in rotation and a disengagement position, at which the first roller is an idle roller.

Friction enables the first roller either to rotate being driven by the second roller at a peripheral speed lower than that of the second roller or to be driven in an idle manner by the continuous elongated element or the forming drum.

Preferably, the outlet opening of the extruder is fixed relative to the supporting base.

The outlet opening is fixed on the base and faces the calender slit and the calender is pivotally mounted on the base and can oscillate around an axis passing through said slit, so as to maintain said distance between the outlet opening and the slit constant.

Preferably, the first roller has a greater diameter than a diameter of the second roller.

Preferably, the diameter of the first roller is included between about 90 mm and about 300 mm.

Preferably, the diameter of the second roller is included between about 80 mm and about 250 mm.

Such a structure enables the first roller to rest against the drum without the drum interfering with the extruder and without the second roller interfering with the drum itself.

According to a preferred embodiment, the actuating device comprises a pneumatic piston mounted between the frame and the supporting base.

According to a preferred embodiment, the apparatus comprises an auxiliary wheel mounted on the supporting base and disposed close to the first roller.

The wheel too is mounted on the base in such a manner as to be able to take up possible unevenness of the deposition surface.

Preferably the wheel is pushed towards the forming drum through an auxiliary pneumatic piston, so as to take up the unevenness of the forming drum, irrespective of the first roller and thus of the frame to which the first roller is secured.

Further features and advantages will become more apparent from the detailed description of a preferred but not exclusive embodiment of a method of controlling deposition of a continuous elongated element in building a tyre for vehicle wheels, a process and an apparatus for building a tyre for vehicle wheels according to the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

Figure 1:
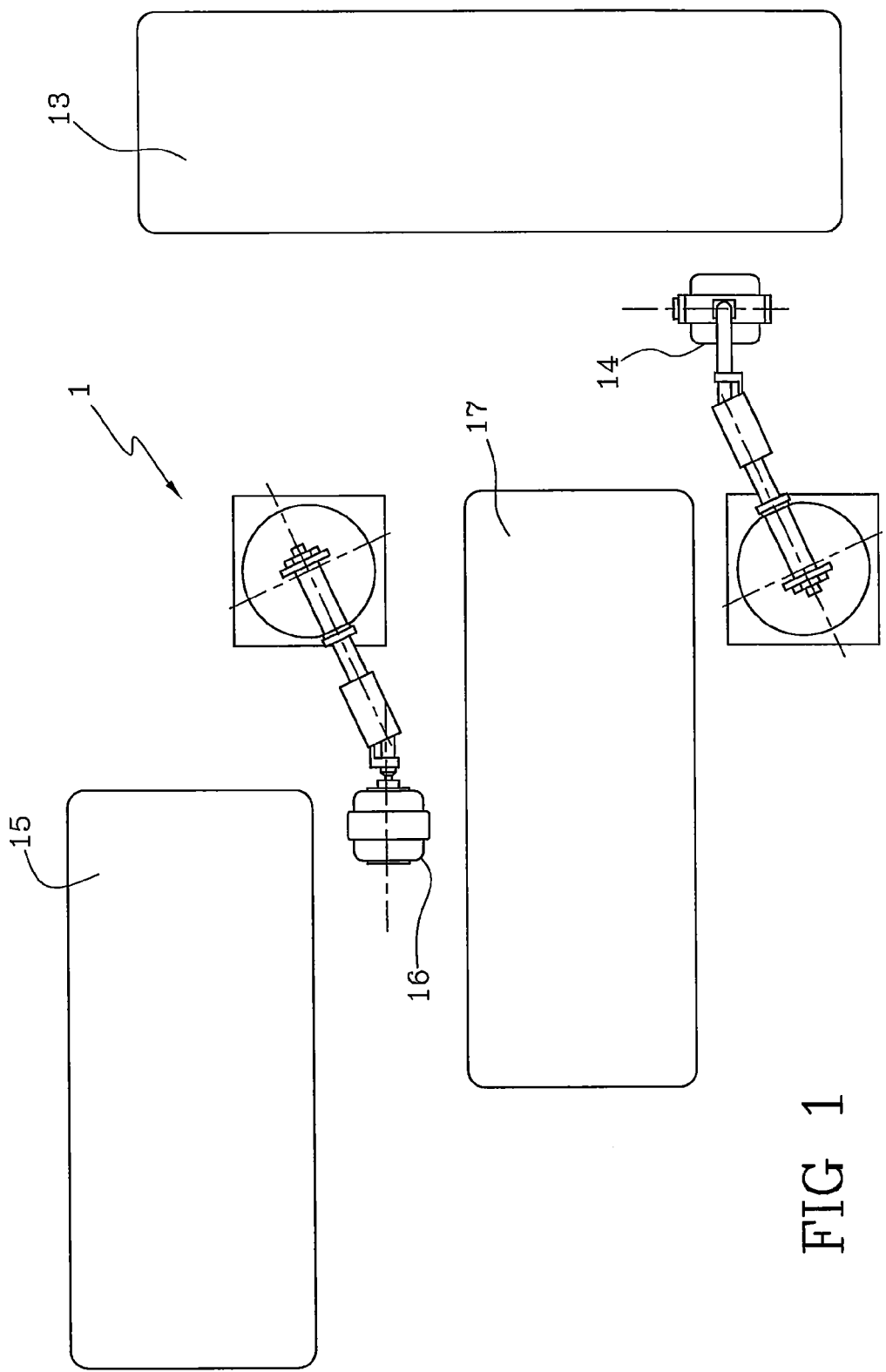
FIG. 1 diagrammatically shows a plant for building tyres for vehicle wheels.

With reference to the drawings, a plant for building tyres for vehicle wheels comprising at least one apparatus 2 for building a tyre for vehicle wheels according to the invention has been generally identified with reference numeral 1.

Plant 1 is designed to manufacture tyres 3 essentially comprising a carcass structure 4 having at least one carcass ply 5. A layer of an airtight elastomeric material or liner 6 can be applied internally of the carcass ply/plies 5. Two annular anchoring structures 7 each comprising a so-called bead core 7a carrying an elastomeric filler 7b at a radially external position are in engagement with respective end flaps 5a of the carcass ply or plies 5. The annular anchoring structures are integrated in the vicinity of regions usually identified as "beads" 8, at which usually engagement between tyre 3 and a respective mounting rim occurs. A belt structure 9 comprising one or more belt layers 9a, 9b is circumferentially applied around the carcass ply/plies 5 and a tread band 10 is circumferentially superposed on the belt structure 9. So-called "under-belt inserts" 11 can be associated with the belt structure 9 and they are each located between the carcass ply/plies 5 and one of the axially opposite end edges of the belt structure 9. In addition or as an alternative to the under-belt inserts 11, annular inserts (not shown) of elastomeric material and/or comprising textile or metallic cords substantially parallel to the circumferential extension direction of the tyre (a zero-degree belt layer) or other reinforcing elements can be radially superposed at least on the axially opposite end edges of the belt layers 9a, 9b, and/or interposed between the same belt layers 9a, 9b at least at said end edges. Two sidewalls 12, each extending from the corresponding bead 8 to a corresponding side edge of the tread band 10, are applied to the carcass ply/plies 5 at laterally opposite positions.

The aforesaid components of elastomeric material of tyre 3 are manufactured on one or more forming drums by moving said forming drums between different work stations at each of which suitable deposition units preferably apply basic semifinished products onto the forming drum or drums.

In a preferred embodiment diagrammatically shown in FIG. 1 by way of example, plant 1 comprises a carcass-building line 13 at which one or more forming drums 14 are sequentially moved between different work stations designed to form a carcass sleeve on each forming drum 14, which carcass sleeve comprises the carcass ply/plies 5, liner 6, annular anchoring structures 7 and possibly at least part of the sidewalls 12. Simultaneously, in an outer-sleeve building line 15, one or more auxiliary forming drums 16 are sequentially moved between different work stations designed to form an outer sleeve on each auxiliary drum 16, which outer sleeve comprises at least the belt structure 9, tread band 10, and possibly at least part of the sidewalls 12.

Plant 1 further comprises an assembling station 17 at which the outer sleeve is removed from the auxiliary drum 16 to be coupled to the carcass sleeve.

Tyres 3 built by plant 1 are sequentially transferred to at least one vulcanisation unit, not shown.

In accordance with the present invention, at least one of the components of elastomeric material of tyre 3, such as liner 6, fillers 7b and/or other parts of elastomeric material in beads 8, sidewalls 12, tread band 10 and/or others, is obtained by means of the above mentioned apparatus 2. One or more apparatuses 2 of this type can belong to the carcass-building line 13 and/or the outer-sleeve building line 15.

This apparatus 2 comprises at least one feeding unit 18 to supply a continuous elongated element 19 of elastomeric material.

In the embodiment illustrated in a non-limiting sense the feeding unit is an extruder 18 provided with a cylinder into which elastomeric material is introduced. The cylinder, heated to a controlled temperature, operatively houses a rotating screw by effect of which the elastomeric material is pushed along the cylinder towards an outlet opening or die 20 of extruder 18. Consequently, delivered through the outlet opening 20 is the continuous elongated element 19 of raw elastomeric material having a substantially circular cross-sectional profile. Alternatively, the conformation of the outlet opening 20 and, as a result, the cross-sectional profile of the continuous elongated element 19, can be of the ellipsoidal type.

The continuous elongated element 19 coming from extruder 18 is guided to a calender 21 comprising a first roller 22 and a second roller 23 that can rotate around respective parallel rotation axes and are moved close to each other at their radially peripheral portions.

Figure 4:
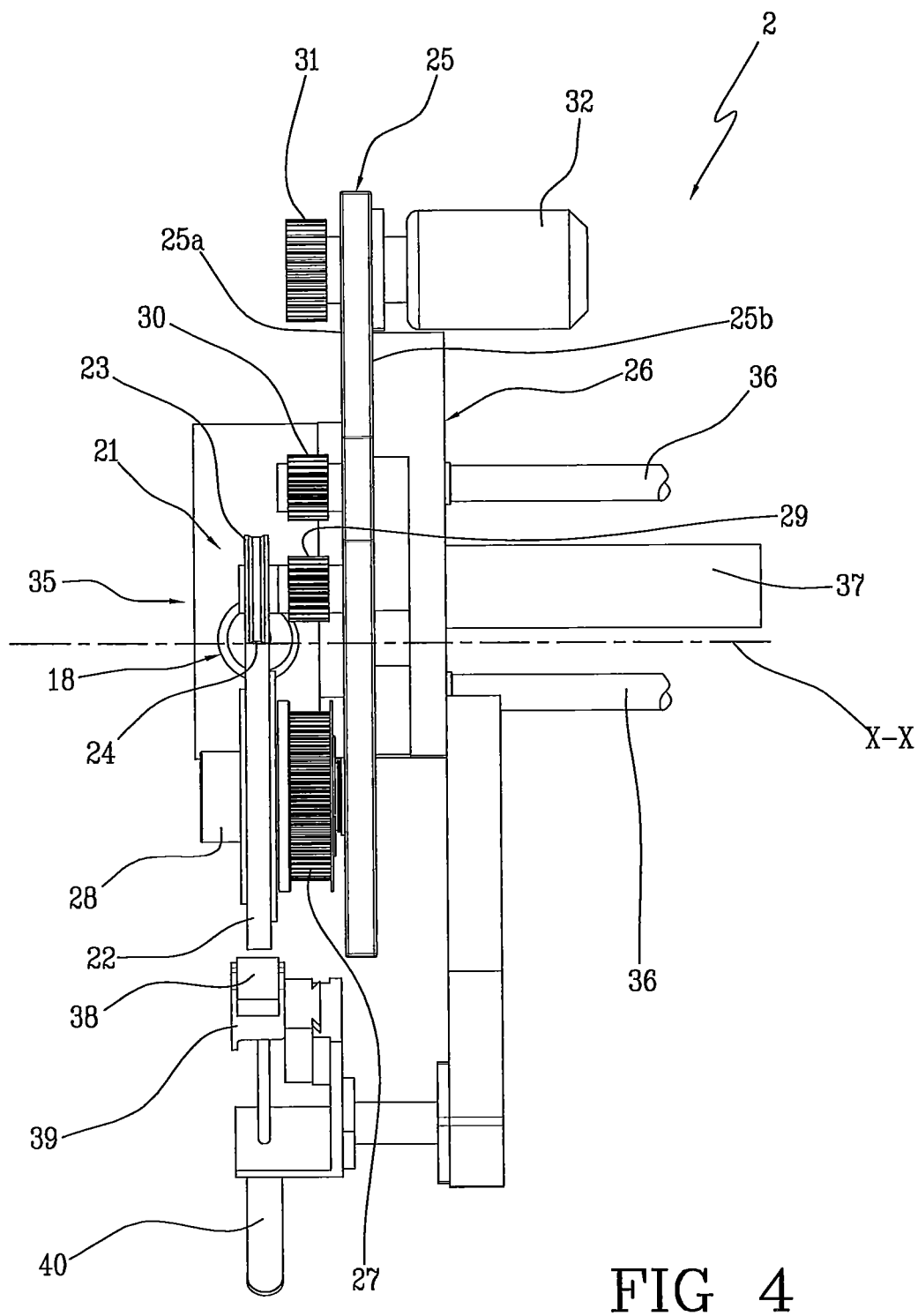
FIG. 4 is a front view of the apparatus seen in FIGS. 2a, 2b and 3.
Figure 5:
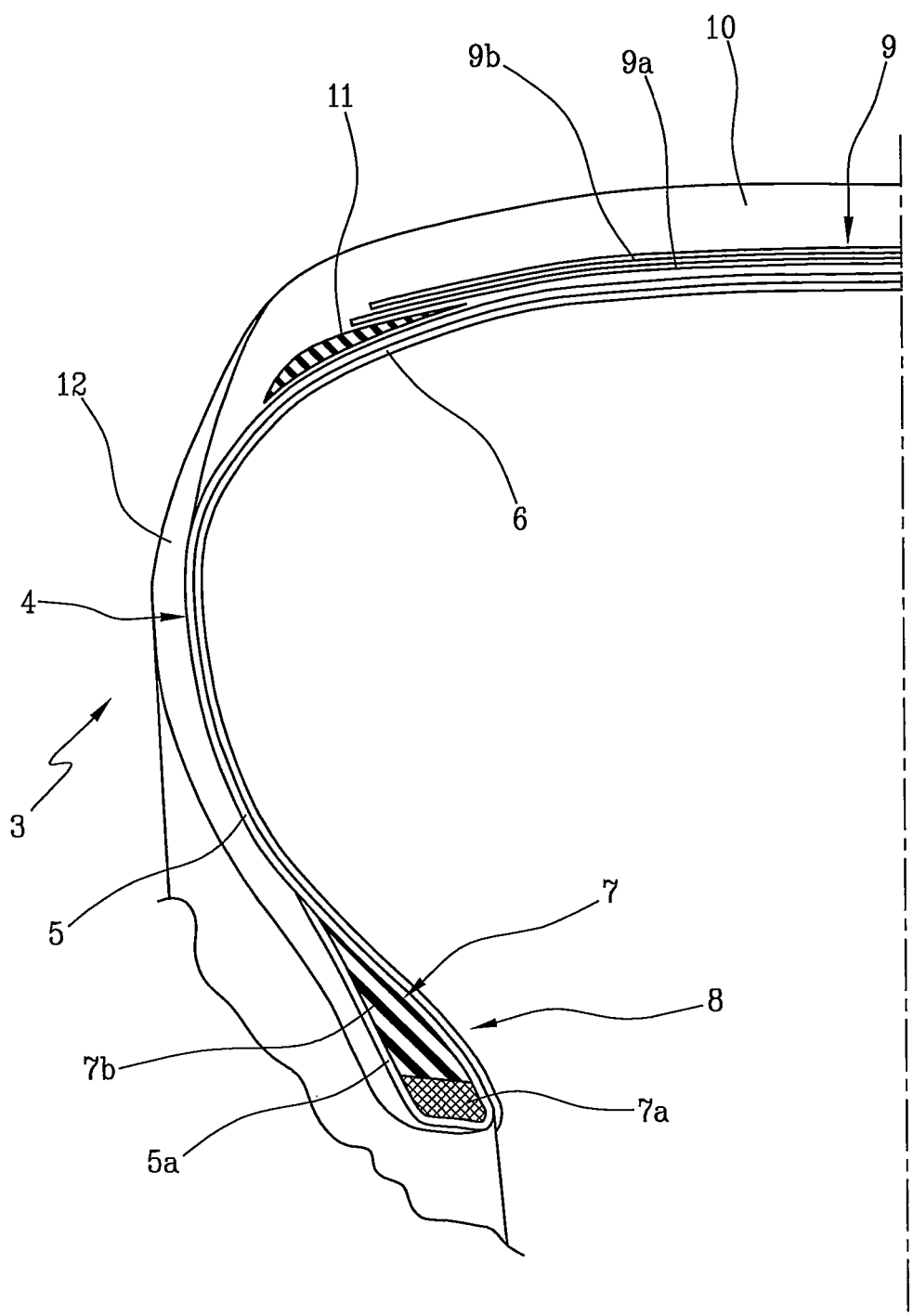
FIG. 5 is a half-section view of a tyre for vehicle wheels obtained following a process in accordance with the invention.

The radially peripheral surface of the first roller 22 is of a substantially cylindrical conformation or in the form of a barrel, while the radially peripheral surface of the second roller 23 has a circumferential groove of suitable conformation (shown in FIG. 4). Thus a shaped slit 24 is defined between the mutually approached rollers 22, 23. The diameter "$D_1$" of the first roller 22 is included between about 90 mm and about 300 mm and the diameter "$D_2$" of the second roller 23 is included between about 80 mm and about 250 mm.

The two rollers are preferably made of metal material and do not suffer deformation when the continuous elongated element 19 passes through slit 24, so as to give the desired section to element 19.

The two rollers 22, 23 of the calender 21 are mounted on a first face 25a of a frame 25 in turn installed on a supporting base 26. Frame 25 has the shape of a plate and carries, pivotally mounted thereon, the pivot pins of the two rollers 22, 23 lying parallel like the respective rotation axes.

Figure 2A:
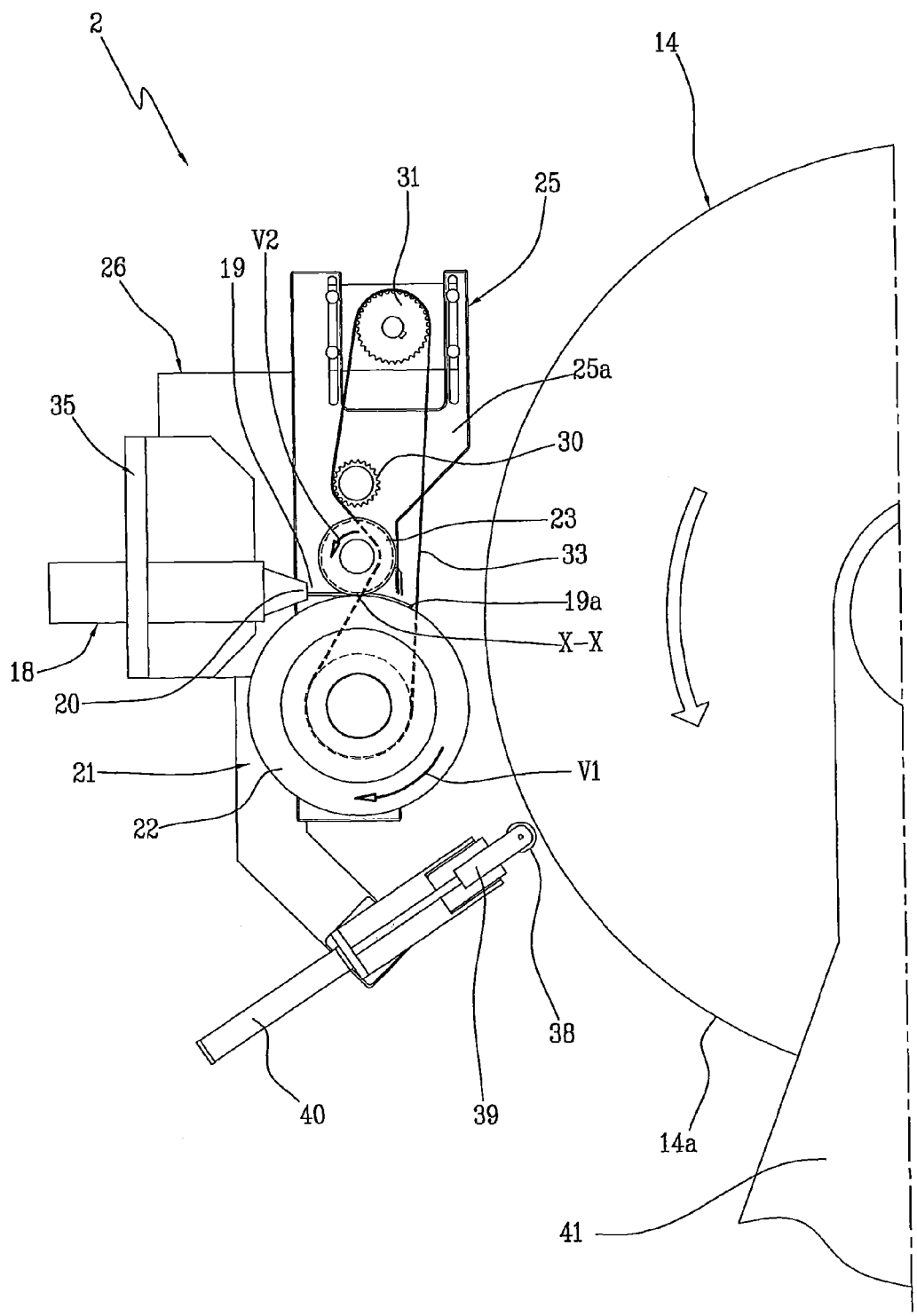
FIG. 2a is an elevation side view of an apparatus according to the invention belonging to the plant in FIG. 1, in a first operating configuration.
Figure 2B:
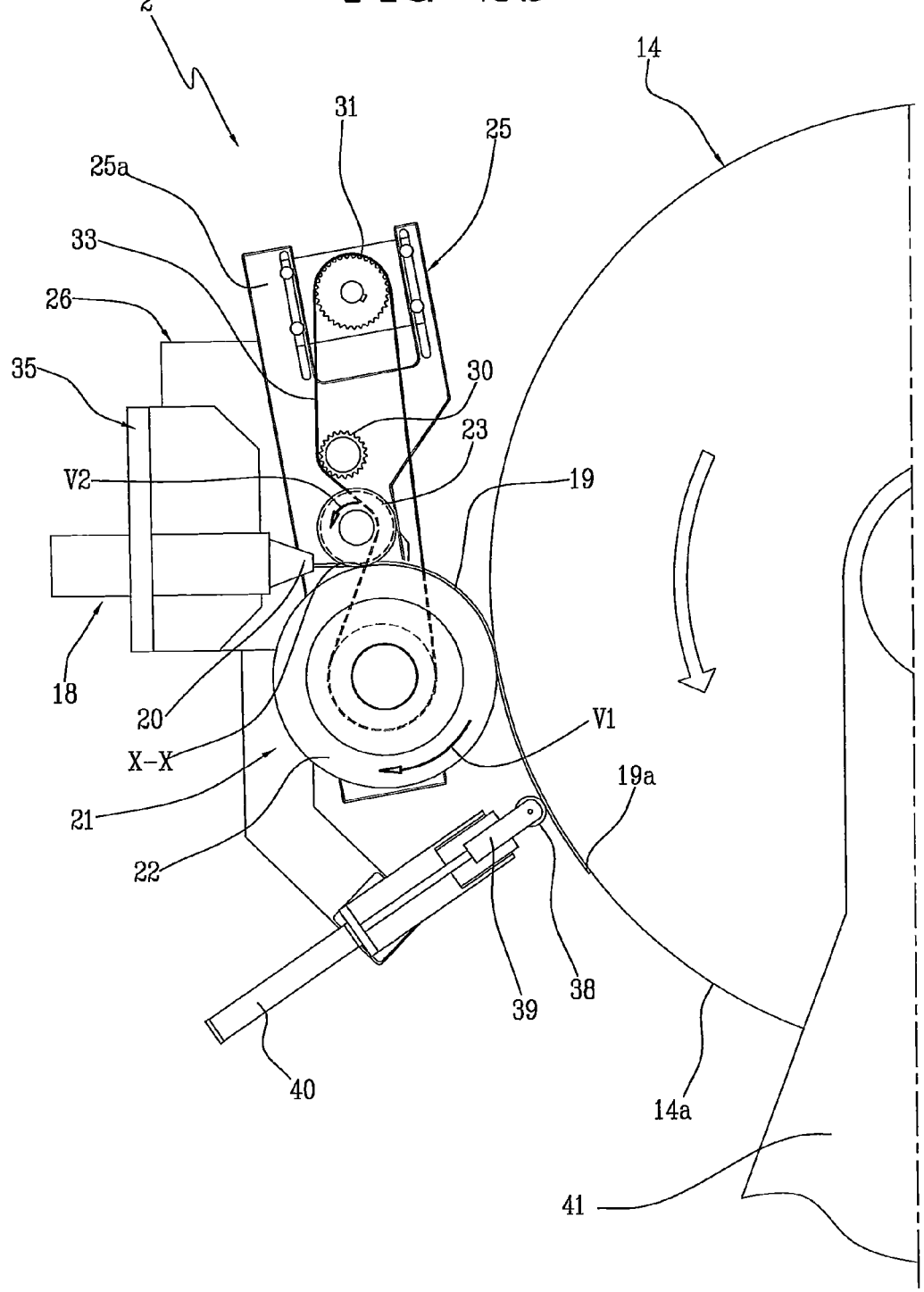
FIG. 2b shows the apparatus in FIG. 2a in a second operating configuration.
Figure 3:
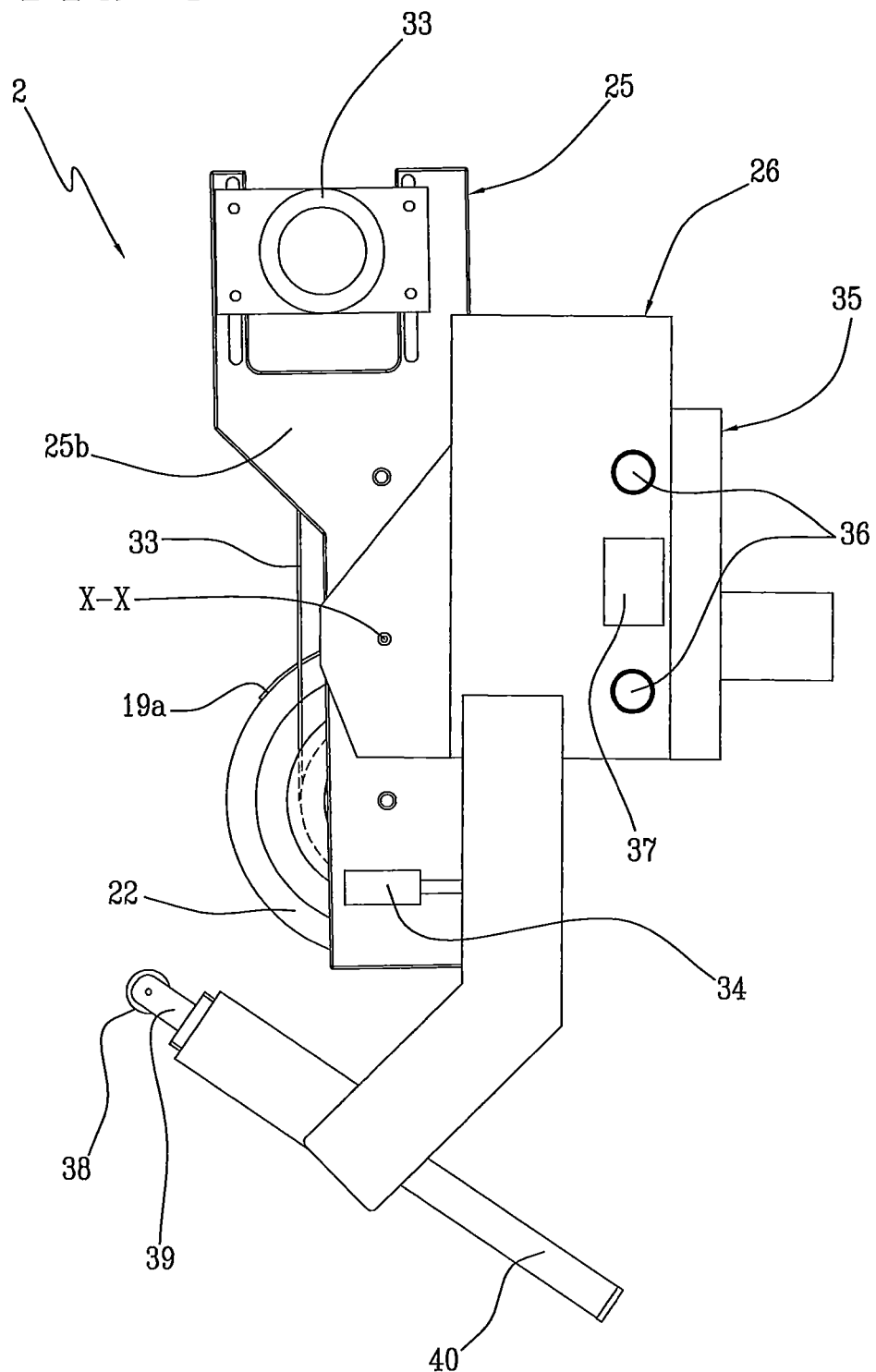
FIG. 3 is an elevation side view of the apparatus of the invention from a side opposite to that in FIGS. 2a and 2b, in the first operating configuration.

A first gear wheel 27 is rotatably mounted on the first face 25a of frame 25 (FIG. 4) and the first roller 22 is coaxial with said first gear wheel 27 and is connected thereto through a friction mechanism 28 only diagrammatically shown in the form of a box-shaped body (not visible as it is radially internal relative to the gear wheel 27). The friction mechanism 28 is movable between an engagement position, at which the gear wheel 27 is integral with the first roller 22 and rotates together with the latter, and a disengagement position at which the first roller 22 is uncoupled from the first gear wheel 27 and is an idle roller. A second gear wheel 29 is rotatably mounted to the first face 25a of frame 25 and the second roller 23 is coaxial and integral with said second gear wheel 29 (FIG. 4). The second roller 23 too rotates together with said second gear wheel 29. A third gear wheel 30 is idly mounted on the first face 25a of frame 25 and is placed alongside the second gear wheel 29 on the opposite side relative to the first gear wheel 27 (FIGS. 2*a*, 2*b* and 4). A fourth gear wheel 31 is idly mounted on the first face 25*a* of frame 25 (FIGS. 2*a*, 2*b* and 4) and is fitted on a shaft of an electric motor 32 (FIGS. 3 and 4), preferably mounted on frame 25 too. The second gear wheel 29 and third gear wheel 30 are disposed between the first gear wheel 27 and fourth gear wheel 31. A toothed belt 33 (shown in FIGS. 2*a*, 2*b* and 3 but not in FIG. 4) is partly wrapped around each of the gear wheels 27, 29, 30, 31 so as to transmit the rotation motion generated by the electric motor 32 to the first gear wheel 27 and the second gear wheel 29 in opposite ways.

Frame 25 is hinged on the supporting base 26 around an oscillation axis "X-X" which is coincident with a contact generatrix between the first roller 22 and second roller 23, which generatrix is located at the shaped slit 24. The supporting base 26 has a portion 26 adjacent to the second face 25*b* of frame 25 on the opposite side relative to the first roller 22 and the second roller 23.

A pneumatic piston 34 (FIG. 3) has an end connected to frame 25 and an opposite end connected to the supporting base 26 and is spaced from the oscillation axis "X-X". The pneumatic piston 34 is an actuating device and extension or shortening of same, suitably controlled, causes rotation of frame 25 around said oscillation axis "X-X".

The supporting base 26 is in turn installed on a body 35 integral with the extruder and can be moved relative to said body 35 in a direction parallel to the oscillation axis "X-X" along two preferably bar-shaped guides 36, carried by said body 35 and by means of a motor 37.

Apparatus 2 further comprises an auxiliary wheel 38 carried by the supporting base 26 at a lower end thereof in the vicinity of the first roller 22. In greater detail, the auxiliary wheel 38 is idly hinged on the free end of a support 39 the opposite end of which is connected to an auxiliary pneumatic piston 40 mounted on said supporting base 26. The auxiliary wheel 38 is free to rotate around an axis parallel to the oscillation axis "X-X" and around the rotation axes of the first roller 22 and second roller 23.

One of the forming drums 14 carried and rotated around its main axis by a suitable device 41, such as a robotized arm, is brought in face of calender 21.

In accordance with the method and process of the present invention, the extruder is set in operation and produces the continuous elongated element 19 coming out of the outlet opening 20 and passing through the calender slit 24. During the whole working, the outlet opening 20 is fixed relative to the supporting base 26 and faces slit 24.

In this first step, the first roller 22 is spaced apart from the deposition surface 14*a*, i.e. the radially external surface 14*a* of the forming drum 14 (FIG. 2*a*). In addition, the first roller 22 is coupled to the second one 23 and moved by motor 32 through the engaged friction 28, the first and second gear wheel 27, 29 and the toothed belt 33. The number of teeth of the first gear wheel 27 and the second gear wheel 29 and the diameters "$D_1$", "$D_2$" of the first roller 22 and second roller 23 are of such a nature that the peripheral speed "$V_1$" of the first roller 22 is lower than the peripheral speed "$V_2$" of the second roller 23. For example, the ratio of the peripheral speed "$V_2$" of the second roller 23 to the peripheral speed "$V_1$" of the first roller 22 is included between about 1.05 and about 1.25 and is preferably of about 1.16. Preferably, in this first step, the peripheral speed "$V_1$" of the first roller 22 is included between about 40 m/s and about 240 m/s and the peripheral speed "$V_2$" of the second roller 23 is included between about 50 m/s and about 250 ms/s.

Due to this difference in the peripheral speed, the continuous elongated element 19 adheres to and is retained on the peripheral surface of the first roller 22. The initial end 19*a* of the continuous elongated element 19 moves together with said peripheral surface of the first roller 22 and covers an arc of a circumference. Meanwhile, by operating the pneumatic piston 34, frame 25 is rotated around the oscillation axis "X-X" so as to move the first roller 22 close to the forming drum 14 and make the initial end 19*a* of the continuous elongated element 19 rest against the forming drum 14 (FIG. 2*b*) when said initial end 19*a* has carried out together with the first roller 22, a rotation included between about 70° and about 110°, preferably equal to about 90°, calculated starting from slit 24.

The continuous elongated element 19 adheres to the radially external surface 14*a* of the forming drum 14, which surface can be the surface of the forming drum 14 itself or the surface of one or more elements already laid down on the forming drum 14.

After routing of said continuous elongated element 19 between rollers 22, 23 of the calender 21 has occurred, as well as adhesion of said element 19 to one of the rollers, rotation of calender 21 allows the first roller 22 carrying the initial end 19*a* of said continuous elongated element 19 to move close to the forming drum 14 and enables application of the initial end 19*a* to the surface 14*a* radially external to the forming drum 14 in a simple and quick manner and without running the risk that parts in motion of calender 21 may interfere with drum 14 while rotating and with extruder 18 and that drum 14 may interfere with extruder 18 (in particular the reduction gearing and the gear pump of the latter).

Powered rotation of the forming drum 14 drags along the continuous elongation element 19 together with the radially external surface 14*a* of said drum, causing winding up of said element into coils for example disposed in side by side relationship and/or partly superposed, on the drum 14 itself. To this aim, the robotized arm 41 moves the forming drum 14 in front of calender 21 during deposition. If the radially peripheral surface of the first roller 22 is rounded or convex, drum 14 can also be slightly inclined to said first roller 22 for laying down continuous elongated elements 19 on uneven surfaces.

During winding into coils, the auxiliary wheel 38 presses the continuous elongated element 19 against the forming drum 14 for consolidating and compacting the elastomeric material. The auxiliary pneumatic piston 40 is able to take up possible unevenness present on the surface radially external to the forming drum 14.

In accordance with an embodiment of the invention (FIG. 2*b*), during winding into coils, the first roller 22 is maintained against the forming drum 14, the continuous elongated element 19 being interposed therebetween, and rotates in an idle manner, being driven by the drum 14 itself by friction. The peripheral speed of the forming drum 14 can be the same as the peripheral speed "$V_2$" of the second roller 23 or greater. The pneumatic piston 34 takes up possible unevenness present on the surface radially external to the forming drum.

In accordance with an alternative embodiment of the invention, immediately after application of the initial end 19*a* of the continuous elongated element 19 against the forming drum 14, the first roller 22 is again moved away from the surface 14*a* radially external to the forming drum 14 causing rotation of frame 25 in the opposite way around the oscillation axis "X-X" by means of the pneumatic piston 34.

The continuous elongated element 19 is compacted by the auxiliary wheel 38 alone, and the calender 21 works separated from the forming drum 14. Preferably, in addition, the first roller 22 is again coupled to the second roller 23 and the electric motor 32 through the friction mechanism 28 and rotates being driven by belt 33.

In accordance with a preferred embodiment, the friction mechanism 28 has a plurality of operating positions in addition to the idle one, so that under normal working conditions the first roller 22 is rotated at the same peripheral speed "$V_1$" as the peripheral speed of drum 14 and at the peripheral speed "$V_2$" of the second roller or at the same peripheral speed "$V_1$" as the peripheral speed of drum 14 and greater than the peripheral speed "$V_2$" of the second roller 23.

On moving from the position spaced apart from the forming drum 14 to the position adjacent to the latter and vice versa, the pneumatic piston 34 carries out a stroke included between about 10 mm and about 15 mm, which value can be also different from that stated above depending on the position of the pneumatic piston 34, and the first roller 22 carries out a stroke included between about 10 mm and about 30 mm.

When deposition has been completed, the residual continuous elongated element 19 is removed from calender 21, which calender 21 together with frame 25 can be moved apart from the outlet opening 20 of extruder 18, through sliding along guides 36, to enable purging and servicing of the extruder 18 itself.

The invention claimed is:

1. A method of controlling deposition of a continuous elongated element in building a tyre for vehicle wheels, comprising:
   feeding an initial end of a continuous elongated element of elastomeric material through a slit bounded by a first roller and a second roller of a calender;
   initially retaining said continuous elongated element against a peripheral surface of the first roller by driving said first roller in rotation at a peripheral speed lower than a peripheral speed of the second roller;
   laying said initial end of the continuous elongated element against a deposition surface by rotating the calender around an oscillation axis parallel to rotation axes of the first and second rollers, and wherein the oscillation axis is coincident with a contact generatrix between the first and second rollers at the slit;
   dragging along the continuous elongated element with the deposition surface; and
   setting the peripheral speed of the first roller equal to or greater than the peripheral speed of the second roller after laying said initial end of the continuous elongated element against the deposition surface.

2. The method as claimed in claim 1, wherein during initially retaining said continuous elongated element against the peripheral surface of the first roller a ratio of the peripheral speed of the second roller to the peripheral speed of the first roller is between about 1.05 and about 1.25.

3. The method as claimed in claim 1, wherein during initially retaining said continuous elongated element against the peripheral surface of the first roller the peripheral speed of the first roller is between about 40 m/s and about 240 m/s.

4. The method as claimed in claim 1, wherein during initially retaining said continuous elongated element against the peripheral surface of the first roller the peripheral speed of the second roller is between about 50 m/s and 250 m/s.

5. The method as claimed in claim 1, wherein the initial end of the continuous elongated element is laid against the deposition surface after the initial end has carried out, together with the peripheral surface of the first roller, a rotation relative to said slit between about 70° and about 110°.

6. A process for building a tyre for vehicle wheels comprising assembling of components of elastomeric material on a forming drum, wherein at least one of said components of elastomeric material is obtained by:
   producing a continuous elongated element of elastomeric material through an extruder;
   feeding an initial end of said continuous elongated element of elastomeric material onto a peripheral surface of a first roller of a calender through a slit bounded by said first roller and by a second roller of said calender, wherein the initial end of said continuous elongated element is fed onto the peripheral surface of the first roller by setting the first roller in rotation at a peripheral speed lower than a peripheral speed of the second roller;
   rotating the calender around an oscillation axis for moving the first roller from a position spaced apart from the forming drum to a position close to said forming drum until laying said initial end of the continuous elongated element against a deposition surface radially external to said forming drum, wherein the oscillation axis is parallel to rotation axes of the first and second rollers and coincident with a contact generatrix between the first and second rollers at the slit;
   driving the continuous elongated element in rotation with the forming drum so as to determine application of said continuous elongated element onto said forming drum; and
   setting the peripheral speed of the first roller equal to or greater than the peripheral speed of the second roller after laying said initial end of the continuous elongated element against the deposition surface.

7. The process as claimed in claim 6, comprising: pressing the continuous elongated element against the forming drum by means of the first roller during rotation of said continuous elongated element with said forming drum.

8. The process as claimed in claim 7, wherein the first roller rotates in an idle manner being dragged along by the forming drum.

9. The process as claimed in claim 6, comprising: moving the first roller away from the forming drum after laying said initial end of the continuous elongated element against the deposition surface.

10. The process as claimed in claim 9, wherein the first roller moved away from the forming drum is mechanically coupled to the second roller for rotation, being dragged along by said second roller.

11. The process as claimed in claim 6, wherein the continuous elongated element is pressed against the forming drum by an auxiliary wheel during rotation of said forming drum.

12. The process as claimed in claim 6, wherein the first roller, on moving between the position spaced apart from the forming drum and the position close to said forming drum, carries out a displacement between about 10 mm and about 30 mm.

13. The process as claimed in claim 6, wherein the continuous elongated element is applied onto the forming drum in a form of coils disposed in side by side relationship and/or at least partly overlapped.

* * * * *